April 4, 1961 H. W. CLARKE 2,978,109
RACK
Filed Aug. 29, 1958 2 Sheets-Sheet 1

INVENTOR:
Houghton W. Clarke,

BY
ATTORNEYS.

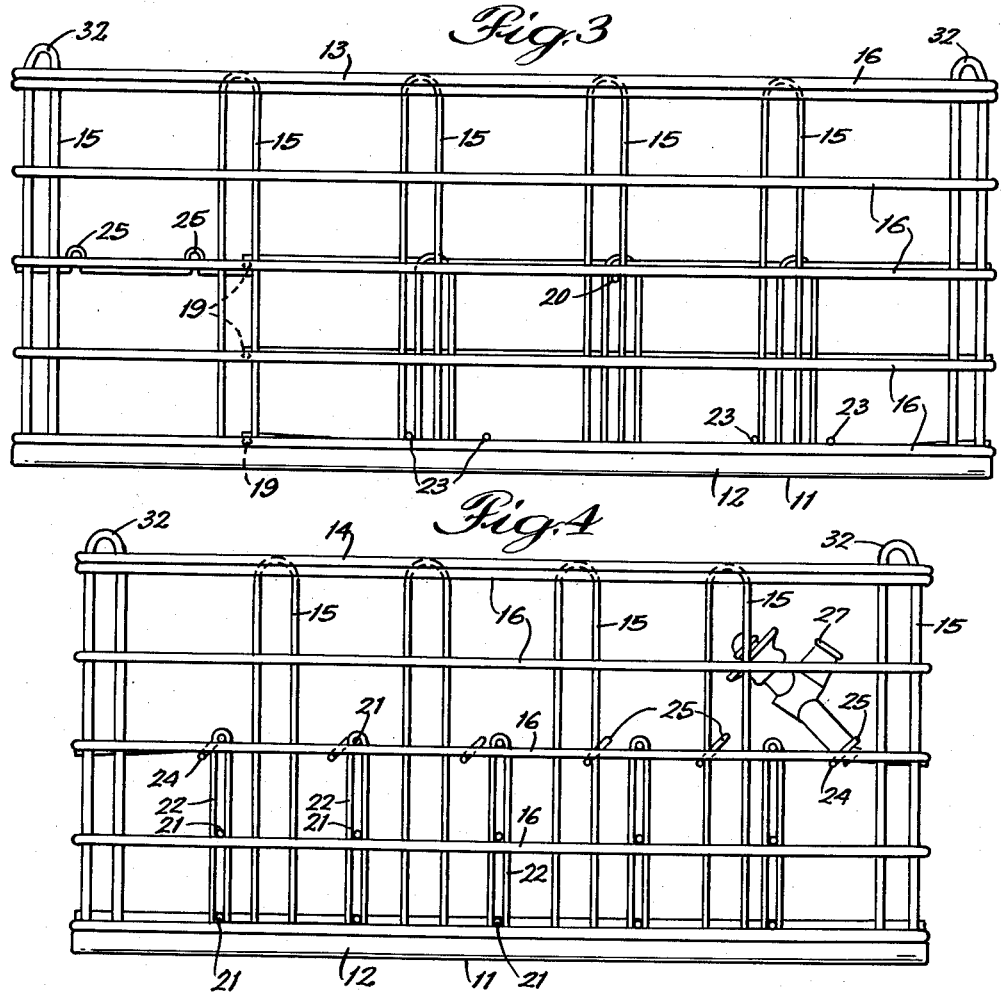

United States Patent Office 2,978,109
Patented Apr. 4, 1961

2,978,109
RACK
Houghton W. Clarke, Evanston, Ill., assignor of ninety-nine percent to Mealpack Corporation, Evanston, Ill., a corporation of Illinois
Filed Aug. 29, 1958, Ser. No. 757,986
7 Claims. (Cl. 211—13)

This invention relates to a rack, and more specifically, to a wire rack particularly suited for holding food or beverage dispenser components during washing, sanitizing, drying or storage.

It has been long recognized that the removable tops, gaskets and spigots of food jars and beverage dispensers present difficult cleaning, handling and storage problems after each use. Also, after various present cleaning methods have been applied it has been difficult to handle, store and re-use such parts without exposure to recontamination.

Spigots have been particularly difficult to clean and to remove odors from because of surface portions which are ordinarily concealed and which tend to collect and retain food particles and flavors. As a result, these articles are commonliy washed by hand even though such procedures are slow and uneconomical, particularly in large institutions, hospitals, hotels, airlines, railways and the like where insulated food and beverage containers are frequently used in large quantities.

Therefore, one of the main objects of the present invention is to provide a rack which overcomes the aforementioned defects and disadvantages and which will hold the parts of food and beverage dispensers so that they may be passed in quantities through typical dishwashing machines for fast, thorough cleaning and sterilization; and so that they may be stored thereafter at points of reuse where operators may easily remove and assemble the parts. In this connection, it is a specific object to provide a rack particularly suited for supporting the spigots of liquid food and beverage dispensers and which holds the spigot valves in open condition so that the surface portions thereof may be thoroughly washed, rinsed and dried.

Other objects will appear from the specification and drawings in which:

Figure 3 is a side elevation of the rack shown in Figure 1;

Figure 4 is an end elevation of the rack embodying the present invention.

Figure 1:
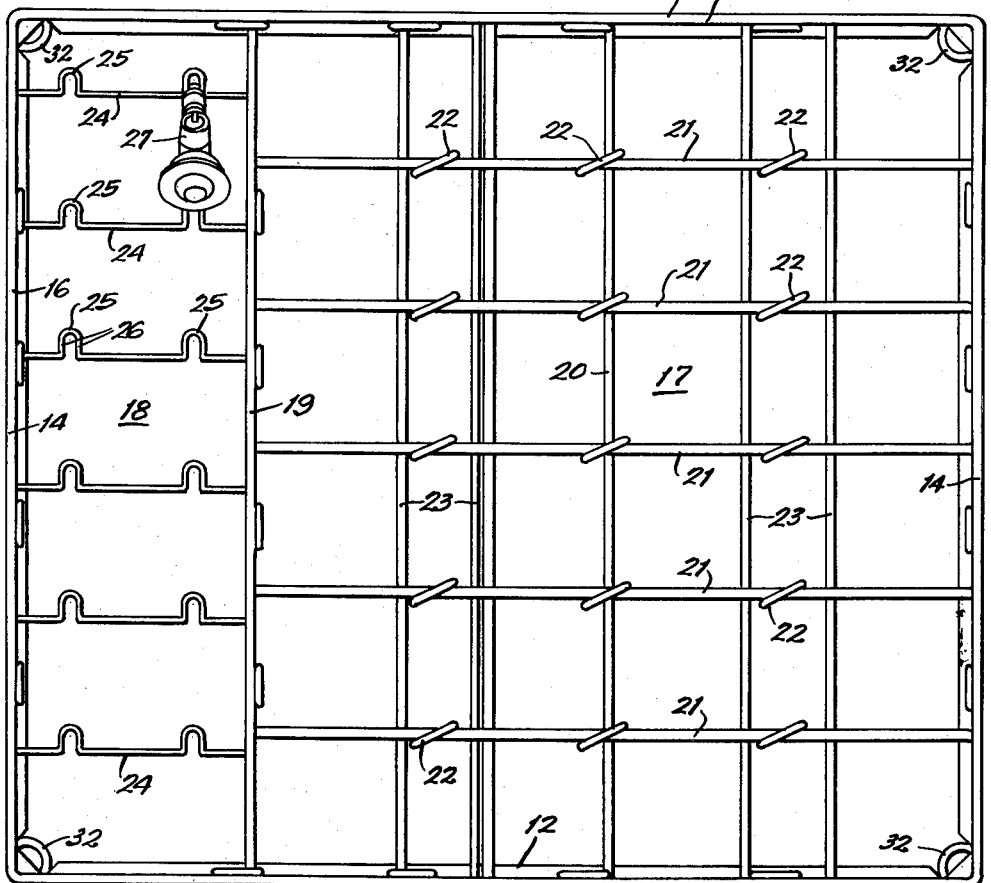
Figure 1 is a top plan view of a rack embodying the present invention.

Referring to the drawings, the numeral 10 generally designates a rack constructed from formed and interconnected pieces of wire. While stainless steel wire has been found particularly effective, it will be understood that other materials such as plated wire or suitable plastic materials might be used. The important considerations are that the material be strong, durable and capable of withstanding high sterilizing temperatures.

Rack 10 has a rectangular base or bottom wall 11 defined by a perimetric wire rim or border 12. The side and end walls 13 and 14 of the rack are formed from a plurality of horizontally spaced upstanding wire hoops 15 each of which has the general shape of an inverted U and has its lower ends welded or otherwise secured to the frame 12. A series of vertically spaced and perimentrically extending wires 16 extend about the hoops 15 and are welded thereto to complete the side and end walls of the rack.

In the illustration given, the rectangular rack is transversely divided into a pair of sections; a top-supporting section 17 and a spigot-supporting section 18 (Figure 1). However, since the present invention is primarily embodied in the spigot-supporting section it will be understood that the relative sizes of these sections may be varied considerably and that if desired the entire rack may be adapted for supporting only spigots.

The top or cover supporting section 17 is separated from the spigot-carrying section by three transversely extending and vertically spaced wire bars 19 (Figure 3) which are welded at their ends to the lower three perimetric bars 16. Another transverse bar 20 is disposed intermediate the end wall 14 of section 17 and the transverse bars 19, and is disposed along substantially the same horizontal plane as the uppermost bar 19. A plurality of longitudinally extending bars 21 are arranged in vertically aligned groups of three, each of the groups being uniformly spaced apart to define along the transverse bars 19 and 20 and walls 13 and 14 a plurality of article-receiving compartments or pockets. Short loops 22 straddle the longitudinal bars 21 of each group to reinforce and hold the members securely in place, while pairs of transverse members 23 extend between side portions of the lowermost bar 16 to complete the base or bottom wall of the cover-supporting section so that covers will not drop downwardly through the compartments thereof.

The supporting means of the spigot-carrying section 18 consists of a plurality of longitudinally extending wire bars or members 24. Each of these members is secured at one end to a portion of the intermediate bar 16 extending along the nearest end wall 14 while the opposite end of that member is welded or otherwise secured to the intermediate transverse member 19.

Figure 2:
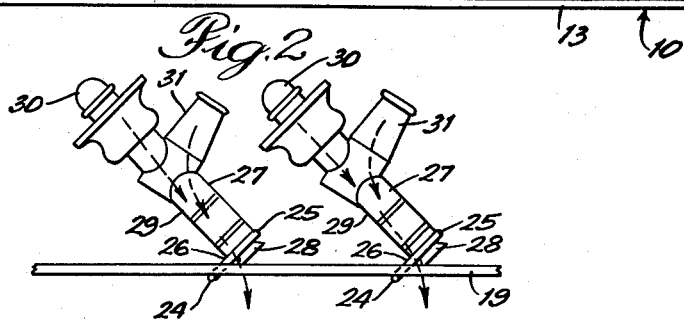
Figure 2 is an enlarged broken side elevation of the rack showing the spigot supporting means thereof.

As shown most clearly in Figures 1 and 2, each of the spigot-supporting bars 24 is bent to define a plurality of integral loops 25. Each of the loops has a generally inverted U-shaped configuration and slopes upwardly at approximately 45 degrees. It will be noted that the side portions 26 of the loops are parallel and are spaced apart for snugly receiving therebetween the lower stem portion of a spigot represented generally by the numeral 27.

Referring to Figure 2, it will be seen that each spigot 27 has a valve stem 28 slidable longitudinally through valve body 29. At its lower end, the stem is provided with a conical valve portion which normally seats against a similarly shaped valve seat provided by body 29. By depressing button 30, the valve member is unseated to place the passages of nozzle portion 31 and body portion 29 in communication.

An important aspect of the present invention lies in the means for supporting the spigots and at the same time holding the valve members of those spigots in open position. As a result, the inner surfaces of the spigots may be washed, rinsed and drained in a suitable washing machine. Such an operation is not only faster than conventional hand washing, but is more effective because of the high temperatures (180° F. or more) and pressures of the wash and rinse water. Furthermore, since the spigots may be drained, transferred and stored in their inclined positions within the rack and since they need not be handled until they are ready for use, it is believed apparent that the rack construction of the present invention aids in safe-guarding public health wherever such units are used in connection with public meal services.

Effective draining results from the inclination of the spigots and the inverted U-shaped configuration of the loops which therefore do not obstruct the flow of water into or out of the spout 31 and valve body 29. In other words, loop 25 has an inner diameter slightly greater than the diameter of the valve stem 28 but smaller than the diameter of either the conical valve head or the body 29. The biasing means (not shown) of each spigot urges the valve stem upwardly and thereby clamps the loop 25 between the conical head and the lower end of body 29. As a result of this clamping action, a substantial portion of the passage through the valve body is sealed by the loop 25. However, since the loop has an inverted U-shaped configuration the lowest point of the passage through the valve body is necessarily held open to insure proper drainage of the spigot.

While each spigot is held in place largely because of the clamping action of the upwardly biased valve stem 28, the clamping action of the side portions 26 of each loop may have a contributing effect. Thus, where the distance between the parallel side portions 26 is slightly less than the diameter of the valve stem of a spigot, the flexible wire member 24 may bow slightly downwardly to accommodate a spreading of the loop side portions 26 when the valve stem is forced therebetween. Under these conditions, the restoration forces of the flexible wire supporting bars 24 combine with the clamping action of the spring urged valve head to firmly and frictionally lock the spigot in place.

From Figure 4 it will be seen that spigots do not project above the upper edges of the side and end walls when those spigots are held in place by the inverted loops of the wire members. It will also be noted that the corner loops of the rack have upper portions 32 which project upwardly above the uppermost perimetric frame member 16 and which curve inwardly so that they will be readily received within the area defined by the base frame 12 of a rack stacked thereon. Thus, a number of racks may be stacked in nested relation for the simultaneous washing, rinsing, sanitizing, drying, transfer or storage of a large number of spigots and beverage or food dispenser parts.

While in the foregoing I have disclosed an embodiment of the present invention in considerable detail for purposes of illustration, it will be understood by those skilled in the art that many of these details may be varied considerably without departing from the spirit and scope of the invention.

I claim:

1. In combination with a spigot having a hollow valve body provided with an external valve seat at one end thereof and having a valve stem equipped with an external valve head and adapted to be moved axially between an open position wherein said head is spaced outwardly from said seat and a closed position wherein said head contacts said seat, a wire rack having at least one wire spigot-supporting member, said member having a plurality of U-shaped wire loops formed integrally therewith, each of said loops having substantially parallel side portions for receiving therebetween the valve stem of a spigot between said head and said valve seat for holding said spigot in place while at the same time maintaining said headed valve stem in open condition.

2. The structure of claim 1 in which each of said wire loops are spaced apart and lie along an inclined plane with the open ends thereof facing downwardly.

3. The structure of claim 1 in which said spigot-supporting member is disposed intermediate the upper and lower limits of said rack.

4. The structure of claim 1 in which said rack is provided with a plurality of wire spigot-supporting members extending horizontally and being disposed in parallel relation.

5. In combination with a spigot having a hollow valve body provided with a valve seat at one end thereof and having a valve stem equipped with a valve head and adapted to be moved axially between an open position wherein said head is spaced outwardly from said seat and a closed position wherein said head contacts said seat, a wire rack having a plurality of spigot-supporting members disposed intermediate the upper and lower limits of said rack, each of said spigot-supporting members comprising a horizontal wire bar having a plurality of integrally formed inverted U-shaped loops extending along an inclined plane, said loops each having smooth sides spaced substantially uniformly apart for receiving therebetween the valve stem of a spigot between the head and valve seat of said spigot, said loop having upper end portions of an internal width no greater than the shortest distance between said sides, whereby, said loop holds said spigot in place while at the same time maintaining the headed valve stem thereof in open position.

6. The structure of claim 5 in which said valve stem is biased for movement into closed positon, whereby, said loop of said rack is clamped by said spigot between said head and said valve seat.

7. In a wire rack for holding food dispenser components including a spigot having a hollow valve body provided with an external valve seat at one end thereof and having a valve stem equipped with an external valve head and adapted to be moved axially between an open positon wherein said head is spaced outwardly from said seat at a closed position wherein said head contacts said seat, a spigot-supporting member disposed intermediate the upper and lower limits of said rack, said member comprising a horizontal wire bar having an integrally formed inverted U-shaped loop extending along an inclined plane passing longitudinally through said bar, said loop having smooth sides substantially uniformly spaced apart and having an upper end portion of an internal width no greater than the shortest distance between said sides, whereby, said loop is adapted to receive snugly between the sides thereof the valve stem of a spigot between said head and said seat for holding said spigot in place while at the same time maintaining the headed valve stem in open position.

References Cited in the file of this patent
UNITED STATES PATENTS

| | | |
|---|---|---|
| 934,721 | Garretson | Sept. 21, 1909 |
| 1,936,164 | Jarvis | Nov. 21, 1933 |
| 2,559,060 | Zenick | July 3, 1951 |
| 2,864,509 | Watral | Dec. 16, 1958 |